(12) United States Patent
Sangappa et al.

(10) Patent No.: US 12,315,192 B2
(45) Date of Patent: May 27, 2025

(54) POSE ESTIMATION AND CORRECTION

(71) Applicant: Entrupy Inc., New York, NY (US)

(72) Inventors: Hemanth Kumar Sangappa, Bangalore (IN); Aman Jaiswal, Kasia (IN); Rohan Sheelvant, Pune (IN); Ashlesh Sharma, Redmond, WA (US)

(73) Assignee: Entrupy Inc., New York, NY (US)

( * ) Notice: Subject to any disclaimer, the term of this patent is extended or adjusted under 35 U.S.C. 154(b) by 493 days.

(21) Appl. No.: 17/871,958

(22) Filed: Jul. 24, 2022

(65) Prior Publication Data

US 2023/0143551 A1 May 11, 2023

Related U.S. Application Data

(63) Continuation of application No. 17/503,549, filed on Oct. 18, 2021, now Pat. No. 11,430,152.

(51) Int. Cl.
*G06T 7/73* (2017.01)
*G06T 3/40* (2024.01)
(Continued)

(52) U.S. Cl.
CPC .............. *G06T 7/74* (2017.01); *G06T 3/40* (2013.01); *G06T 7/10* (2017.01); *G06T 7/50* (2017.01);
(Continued)

(58) Field of Classification Search
CPC .. G06T 7/50; G06T 7/536; G06T 7/55; G06T 7/579; G06T 7/586; G06T 7/593;
(Continued)

(56) References Cited

U.S. PATENT DOCUMENTS

2016/0086017 A1 3/2016 Rodriguez
2017/0154426 A1 6/2017 Cheng
(Continued)

OTHER PUBLICATIONS

Szeliski, Richard. Computer Vision: Algorithms and Applications. Springer. (Year: 2011).
Alcorn, Michael A., et al. "Strike (With) a Pose: Neural Networks are Easily Fooled by Strange Poses of Familiar Objects." 2019 IEEE/CVF Conference on Computer Vision and Pattern Recognition (CVPR). IEEE, 2019. (Year: 2019).
(Continued)

*Primary Examiner* — Geoffrey E Summers
(74) *Attorney, Agent, or Firm* — Cognition IP, P.C.; Edward Steakley; Rajesh Fotedar

(57) ABSTRACT

Various embodiments are directed to a Pose Correction Engine ("Engine"). The Engine generates a reference image of the object of interest. The reference image portrays the object of interest oriented according to a first pose. The Engine receives a source image of an instance of the object. The source image portrays the instance of the object oriented according to a variation of the first pose. The Engine determines a difference between the first pose of the reference image and the variation of the first pose of the source image. The Engine identifies, based on the determined difference, one or portions of a three-dimensional (3D) map of a shape of the object obscured by the variation of the first pose portrayed in the source image. The Engine generates a pose corrected image of the instance of the object that portrays at least a portion of the source image and at least the identified portion of the 3D map of the shape of the object.

7 Claims, 16 Drawing Sheets

(51) Int. Cl.
　　　*G06T 7/10*　　　(2017.01)
　　　*G06T 7/50*　　　(2017.01)
　　　*G06V 20/00*　　(2022.01)

(52) U.S. Cl.
　　　CPC .... *G06T 2207/10028* (2013.01); *G06V 20/95* (2022.01)

(58) Field of Classification Search
　　　CPC .......... G06T 7/596; G06T 2207/10028; G06T 7/70–77; G06T 7/30–38; G06T 7/10–12; G06T 3/40; G06V 20/95
　　　See application file for complete search history.

(56) References Cited

U.S. PATENT DOCUMENTS

2021/0065432 A1\* 　3/2021　Bickerstaff ............... G06T 7/75
2022/0067994 A1　　3/2022　Neuberger
2023/0351624 A1\* 11/2023　Ruhkamp ............... G06T 7/529

OTHER PUBLICATIONS

Zhang, Xiaozheng, and Yongsheng Gao. "Face recognition across pose: A review." Pattern recognition 42.11 (2009): 2876-2896. (Year: 2009).

\* cited by examiner

POSE ESTIMATION AND CORRECTION

CROSS-REFERENCE TO RELATED APPLICATIONS

This application is a continuation of U.S. application Ser. No. 17/503,549, filed Oct. 18, 2021, which claims the benefit of Indian Patent Application No. 202121039730, filed Sep. 2, 2021, which are hereby incorporated by reference in their entirety.

BACKGROUND

Various industries have experienced an increase in popularity due to a proliferation of brands and products that have increased in value in the resale world. The limited release of some types of specialized models of items has made those limited release items some of the most coveted in the market. Due to the exclusivity of limited release items, counterfeit items have proliferated the marketplace. A hapless user who purchases a limited release item from one of many marketplaces or stores has no knowledge if the item that is purchased is authentic or not. While the marketplace ensures that the item is authentic, customers get duped a lot of times. At times, even the marketplace or store owners are unsure of the authenticity of some items. This leads to a lack of trust in the transaction and may eventually result in curbing the growth of various industries.

SUMMARY

Various embodiments of a Pose Correction Engine ("Engine") provide for significant improvements and advantages over conventional systems by providing the preprocessing of user source images for use in determining whether objects portrayed in user source images are fraudulent or counterfeit. For example, the Engine provides a user(s) the flexibility to capture source images of a physical object in various predefined poses without requiring the user to capture source images that portray the physical object in perfect alignment with the various predefined poses. The user may upload the source images to the Engine and the Engine outputs pose corrected images based on the user's source images. The Engine outputs pose corrected images that represent the source images as though the user successfully captured views of the physical object in perfect alignment with predefined poses.

Various embodiments of an apparatus, methods, systems and computer program products described herein are directed to a Pose Correction Engine ("Engine"). The Engine generates a reference image of the object of interest. The reference image portrays the object of interest ("object") oriented according to a first pose. The Engine receives a source image of an instance of the object. The source image portrays the instance of the object oriented according to a variation of the first pose. The Engine determines a difference between the first pose of the reference image and the variation of the first pose of the source image. The Engine identifies, based on the determined difference, one or portions of a three-dimensional (3D) map of a shape of the object obscured by the variation of the first pose portrayed in the source image. The Engine generates a pose corrected image of the instance of the object that portrays at least a portion of the source image and at least the identified portion of the 3D map of the shape of the object. It is understood that, in various embodiments, an object of interest can be any type of physical object.

In some embodiments, a user may seek to determine whether a particular shoe is authentic. The user captures one or more source images of the shoe, wherein each respective image portrays a particular perspective view of the shoe. The user uploads the one or more source images to the Engine. The Engine pre-processes the one or more source images in preparation for authentication processing of the particular shoe.

The Engine accesses a reference image of the particular shoe, but the reference image may portray the particular shoe according to a specific pose (i.e. position and orientation). A source image may also portray the particular shoe according to a pose that is nearly similar to the specific pose of the reference image. Stated differently, the pose of the source image may not be a perfect match to the specific pose the reference image. The Engine pre-processes the source image and the reference image according to a segmentation phase, a depth estimation phase, a scaling phase, and a registration phase in order to generate a pose corrected image. The pose corrected image output by the Engine represents a version of the source image that portrays the particular shoe according to the specific pose of the reference image.

In various embodiments, the Engine generates and stores a plurality of reference images for one or more types of objects of interest. For example, for a particular type of shoe, the Engine generates multiple reference images of that particular type of shoe, wherein each respective image portrays that particular type of shoe in a different pose (i.e. in a different position and orientation).

In one or more embodiments, the Engine trains a machine learning network(s) on the reference images during a training phase. In various embodiments, the training phase includes a feedback propagation loop.

According to some embodiments, the scaling phase implemented by the Engine includes applying one or more scaling factors to a depth map image based on the reference image.

In various embodiments, the registration phase implemented by the Engine generates one or more translation parameters and one or more rotation parameters. The Engine applies the translation parameters in the rotation parameters to the source image to generate the pose corrected image.

In one or more embodiments, a user may place a physical object in a lightbox that situates the physical object in a particular predefined pose. The lightbox may include one or more apertures for predefined fixed camera lens positions. The user may capture one or more source images with the cameras associated with lightbox. The Engine may pre-process a particular source image captured at the lightbox to output a corresponding pose corrected image. The Engine may further utilize data from the registration phase of that particular source image in order to generate respective pose corrected images of the other source images captured at the lightbox.

Various embodiments include a module(s) and/or one or more functionalities to redact privacy information/data, to encrypt information/data and to anonymize data to ensure the confidentiality and security of user and platform information/data as well as compliance with data privacy law(s) and regulations in the United States and/or international jurisdictions.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
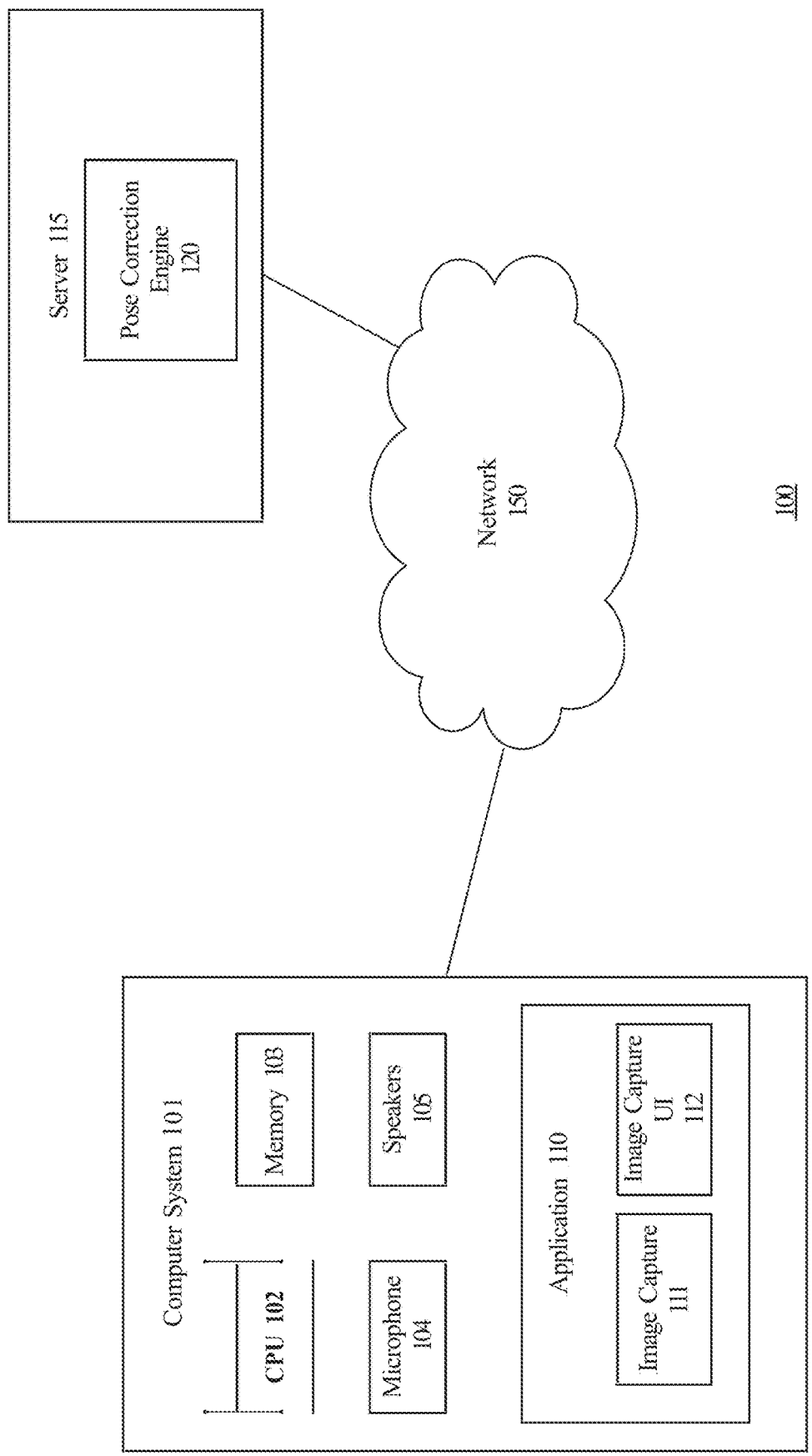
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1A Computer system 101 may comprise, for example, a smartphone, smart device, smart watch, tablet, desktop computer, laptop computer, notebook, server, or any other processing system. In some embodiments, the computer system 101 is mobile so that it fits in a form factor that may be carried by a user. In other embodiments, the computer system 101 is stationary. The computer system 101 may include a CPU 102 and memory 103. The computer system 101 may include internal or external peripherals such as a microphone 104 and speakers 105. The computer system may also include authentication application 110, which may comprise an image capture system 111 and a user interface (UI) system 112. For example, the image capture system may correspond to functionality for displaying one or more graphical overlays via the UI 112.

The computer system 101 may be connected to a network 150. The network 150 may comprise, for example, a local network, intranet, wide-area network, internet, the Internet, wireless network, wired network, Wi-Fi, Bluetooth, a network of networks, or other networks. Network 150 may connect a number of computer systems to allow inter-device communications. Server 120 may be connected to computer system 101 over the network 150. The server 115 may comprise an a pose correction engine 120.

The environment 100 may be a cloud computing environment that includes remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 1B:
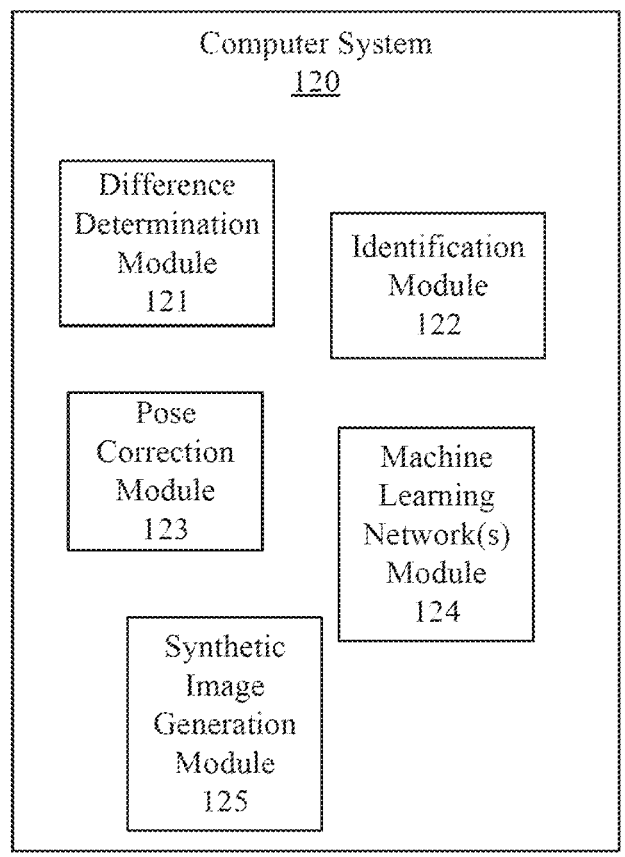
FIG. 1B is a diagram illustrating an exemplary environment in which some embodiments may operate.

FIG. 1B illustrates a block diagram of an example system 120 for a Pose Correction Engine that includes a Difference Determination module 121, an Identification module 122, a Pose Correction module 123, a Machine Learning Network(s) module 124 and a Synthetic Image Generation Module 125. The system 120 may communicate with a user device 140 that sends one or more source images.

The Difference Determination module 121 of the system 120 may perform functionality as illustrated in FIGS. 2A, 2B, 2C, 2D, 2E, 3, 4, 5, 6, 7A, 7B, 7C and/or 8. In some embodiments, the Difference Determination module 121 may perform functionality related to determining a difference between a reference image(s) and a source image(s), wherein the reference image portrays an object according to a first pose and the source image portrays the object according to a second pose that is a variation of the first pose The Identification module 122 of the system 120 may perform functionality illustrated in FIGS. 2A, 2B, 2C, 2D, 2E, 3, 4, 5, 6, 7A, 7B, 7C and/or 8. In some embodiments, the Identification module 122 may perform functionality related to identifying, based on a determined difference, one or portions of a three-dimensional (3D) map of a shape of the object obscured by the variation of the first pose portrayed in the source image.

The Pose Correction module 123 of the system 120 may perform functionality as illustrated in FIGS. 2A, 2B, 2C, 2D, 2E, 3, 4, 5, 6, 7A, 7B, 7C and/or 8. In some embodiments, the Pose Correction module 123 may perform functionality related to generating a pose corrected image of the object that portrays at least a portion of the source image and at least one identified obscured portion of the shape of the object.

The Machine Learning Network(s) module 124 of the system 120 may perform functionality as illustrated in FIGS. 2A, 2B, 2C, 2D, 2E, 3, 4, 5, 6, 7A, 7B, 7C and/or 8. In some embodiments, the Machine Learning Network(s) module 124 may perform functionality related to training, updating and implementing one or more types of machine learning networks.

The Synthetic Image Generation module 125 of the system 120 may perform functionality as illustrated in FIGS. 2A, 2B, 2C, 2D, 2E, 3, 4, 5, 6, 7A, 7B, 7C and/or 8. In some embodiments, the Synthetic Image Generation module 125 may perform functionality related to synthetically generating multiple reference images of a particular types of objects.

One or more software modules of the Engine may be implemented on a computer system associated with a particular end user ("user"). As shown in flowchart 200 of FIG. 2A, the Engine may present one or more graphical overlays in a user interface to the user. (Act 202) A set of graphical overlays may correspond to a predefined pose for a particular type of physical object, such as a shoe. It is understood that there may be a plurality of graphical overlay sets for a particular type of object, wherein each distinct set of graphical overlays represents a particular single predefined pose for the same type of object.

It is further understood that the Engine may have access to a reference image(s) that represents the same type of object according to each predefined pose. For example, a first type of shoe may have at least a first set of graphical overlays for a first predefined pose and also a second set of graphical overlays for a second predefined pose. A first reference image portrays the same type of shoe according to the first predefined pose and a second reference image portrays the same type of shoe according to the second predefined pose.

The user attempts to match camera views of the object with the displayed graphical overlays. (Act 204) For example, one or more graphical overlays may be presented on a user interface as visual guides. The graphical overlays represent target display locations of various portions of a physical instance of a particular type of shoe viewed via a camera functionality. The display graphical overlays act as visual guides to assist the user to generate a source image that portrays an instance of the shoe in a pose that matches the predefined pose that corresponds with the displayed graphical overlays.

The user captures, via a camera associated with the computer system, one or more source images portraying the object according to various object pose variations. (Act 206) Since the user captures the source image in real-time, it is likely that the source image may portray the shoe according to a pose that is not an exact match to the predefined pose that corresponds with the displayed graphical overlays. As such, the pose portrayed in the source image will inevitably be a variation of the predefined pose. The user sends the source image(s) to the Engine for pre-processing in order to generate a pose-corrected image. The pose-corrected image portrays content from the source image as though the user perfectly aligned the graphical overlays with portions of the shoe to create a source image that perfectly matched the predefined pose.

According to various embodiments, the Engine receives one or more source images for preprocessing. The source images may each portray the same particular shoe, but each respective source image may portray that same particular shoe according to a different perspective view. It is understood that a perspective view may be based on a particular position and orientation of the shoe, whereby each particular position and orientation constitutes a pose.

The identified reference images correspond to predefined poses that are similar to the poses portrayed in the received source images. The Engine identifies various reference images of the same particular shoe, wherein each respective reference image portrays that same particular shoe according to various predefined poses. For example, a source image may include metadata that identifies a set of graphical overlays that were displayed to the user when the source image was captured. The Engine may identify a reference image that is associated with the identified set of graphical overlays. The Engine preprocesses one or more of the source images according to various phases in order to output a respective pose corrected image for each preprocessed source image.

Figure 2A:
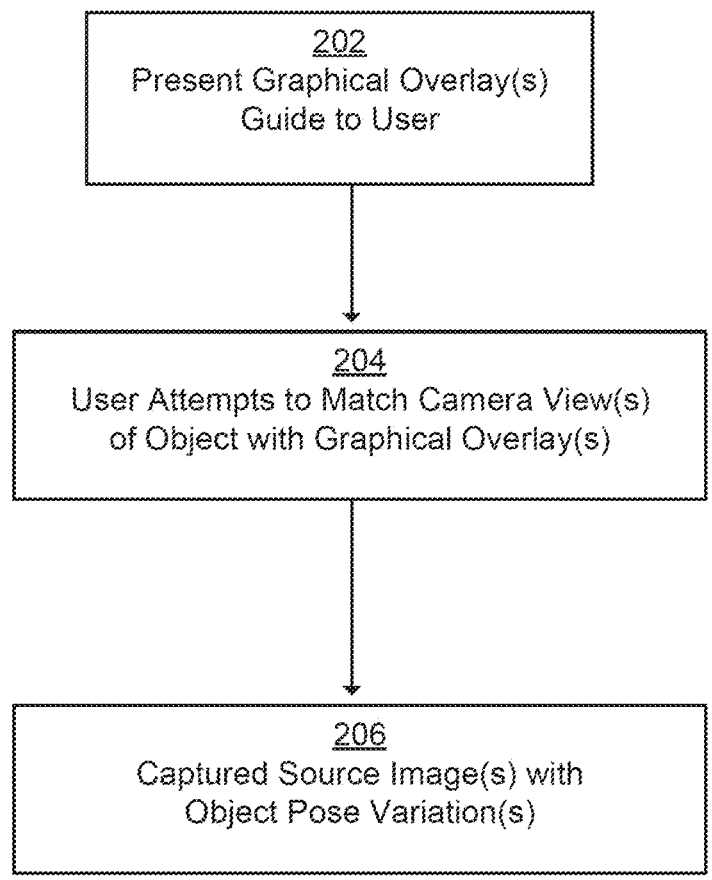
FIGS. 2A and 2B are each a diagram illustrating an exemplary environment in which some embodiments may operate.
Figure 2B:
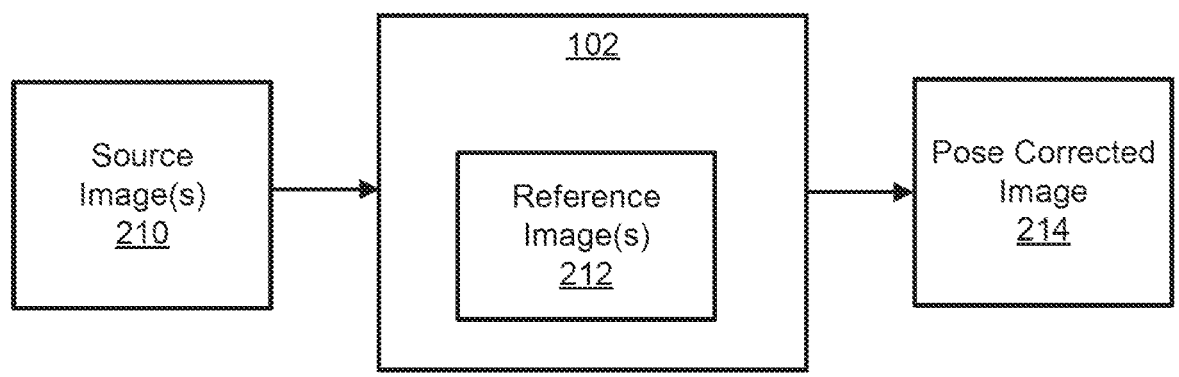

As shown in diagram 208 of FIG. 2B, the Engine receives one or more source images 210. Each source image 210 portrays in object according to a variation of a predefined pose associated with a reference image 212. The Engine identifies respective reference images 212, wherein each identified reference image 212 portrays the same type of object in the predefined pose. For each particular pairing of a source image 210 and a reference image 212, the Engine determines the difference between the paired images 210, 212 and generates a pose corrected image 214.

Figure 2C:
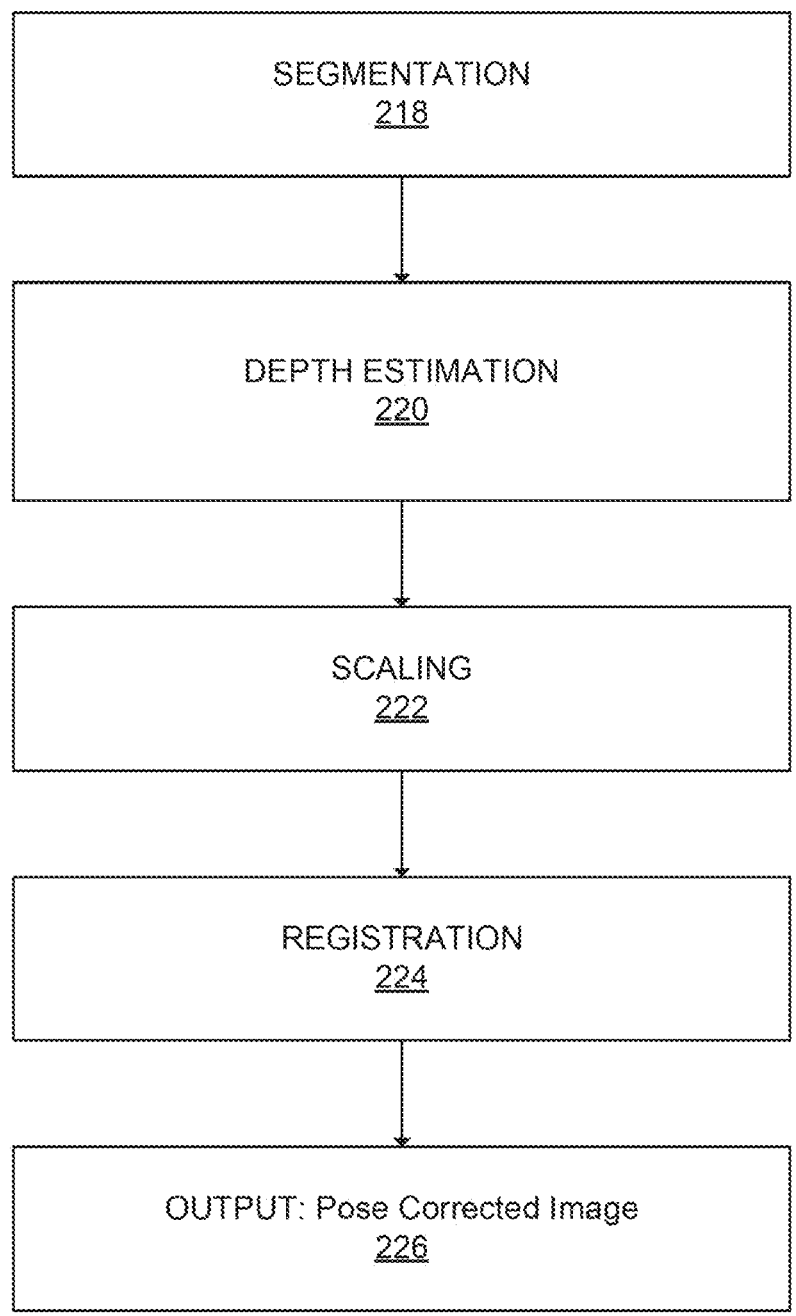
FIG. 2C is a diagram illustrating an exemplary method that may be performed in some embodiments.

As shown in diagram 216 of FIG. 2C, the preprocessing of a source image(s) 210 by the Engine may include one or more preprocessing phases. Upon receipt of a source image(s) 210, the Engine inputs the source image 210 and a corresponding reference image 212 into a segmentation phase 28. The segmentation phase 218 outputs a segmented mask source image and a segmented mask reference image. The Engine inputs the segmented mask source image and the segmented mask reference image into a depth estimation phase 220. The depth estimation phase 220 outputs a depth map source image and a depth map reference image.

The Engine applies one or more scaling factors 222 to the depth map reference image and generates a scaled depth map reference image. The Engine inputs the scaled depth map reference image and the depth map source image into a registration phase 224. The registration phase 224 returns as output 226 a pose corrected image.

Figure 2D:
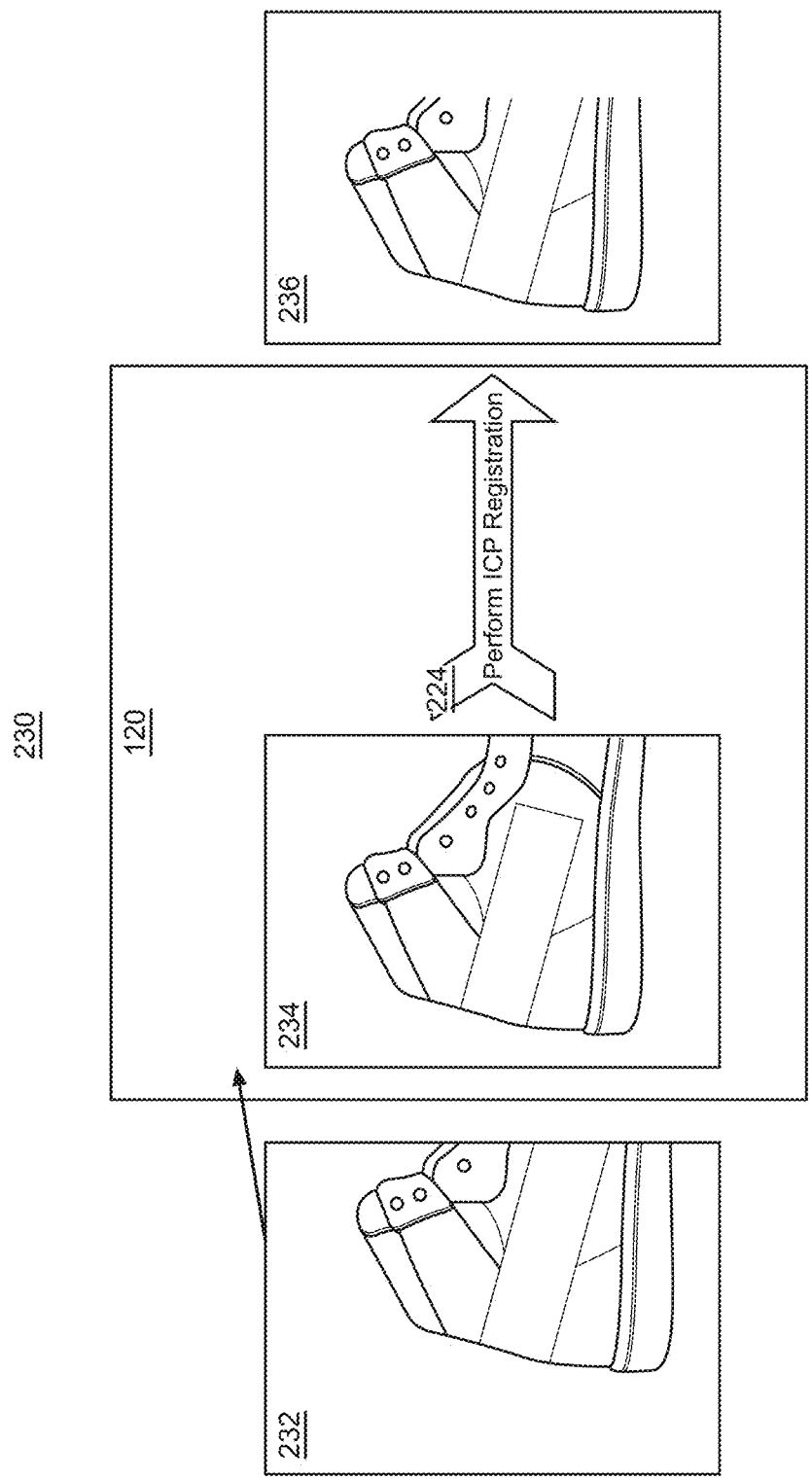
FIG. 2D is a diagram illustrating an exemplary environment in which some embodiments may operate.

As shown in flowchart 230 of FIG. 2D, the Engine receives a source image 232 that portrays a shoe according to a variation of a first pose. The Engine identifies a reference image 234 that portrays the same type of shoe (i.e. model, brand) according to the first pose. The Engine sends the images 232, 234 through pre-processing phases 218, 220, 222, 224, 226. The Engine returns a pose corrected image 236. The pose corrected image 236 includes content from the received source image 232 and further includes content that portrays various parts of the shoe obscured by the pose variation of the source image 232.

Figure 2E:
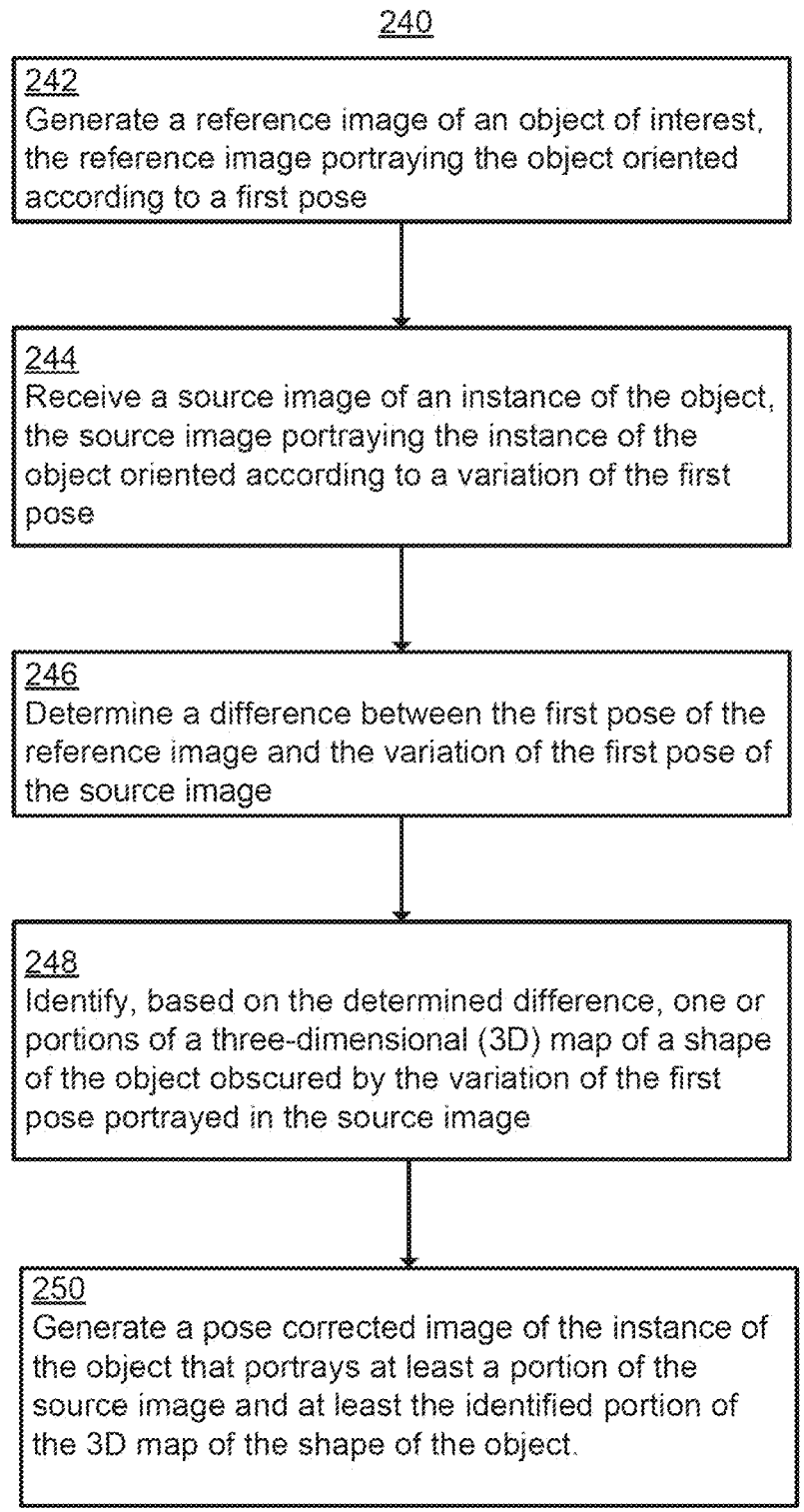
FIG. 2E is a diagram illustrating an exemplary method that may be performed in some embodiments.

As shown in flowchart 240 of FIG. 2E, the Engine generates a reference image of an object of interest. (Act 242) The reference image portrays the object oriented according to a first pose. In various embodiments, the Engine generates a plurality of reference images of the object, wherein each respective reference image portrays the object according to a different pose. The Engine synthetically generates a plurality of reference images and/or generates reference images based on 3D scans of physical instances of the object(s).

The Engine receives a source image of an instance of the object. (Act 244) The source image portrays the instance of the object oriented according to a variation of the first pose. The Engine identifies a reference image that corresponds with the received source image. For example, if the source image portrays a specific shoe model manufactured by a particular shoe company, the Engine identifies a set of reference images that portrays the same specific shoe model. Further, the Engine accesses the identifies set of reference images and selects a reference image that portrays the shoe according to a predefined pose, whereby the source image was captured during display of graphical overlays intended to guide the user to physical orient a camera to create a perspective view the physical shoe according to the predefined pose.

The Engine determines a difference between the first pose of the reference image and the variation of the first pose of the source image. (Act 246) The Engine identifies, based on the determined difference, one or more portions of a three-dimensional (3D) map of a shape of the object obscured by the variation of the first pose portrayed in the source image. (Act 248) The Engine generates segmented mask images for both the source image(s) and the corresponding identified reference image(s). The Engine further generates depth map images based on the segmented mask images.

The Engine generates a pose corrected image of the instance of the object that portrays at least a portion of the source image and at least the identified portion of the 3D map of the shape of the object. (Act 250) The Engine implements a global and local registration phase, as described herein, to the generate a pose corrected image for each received source image.

Figure 3:
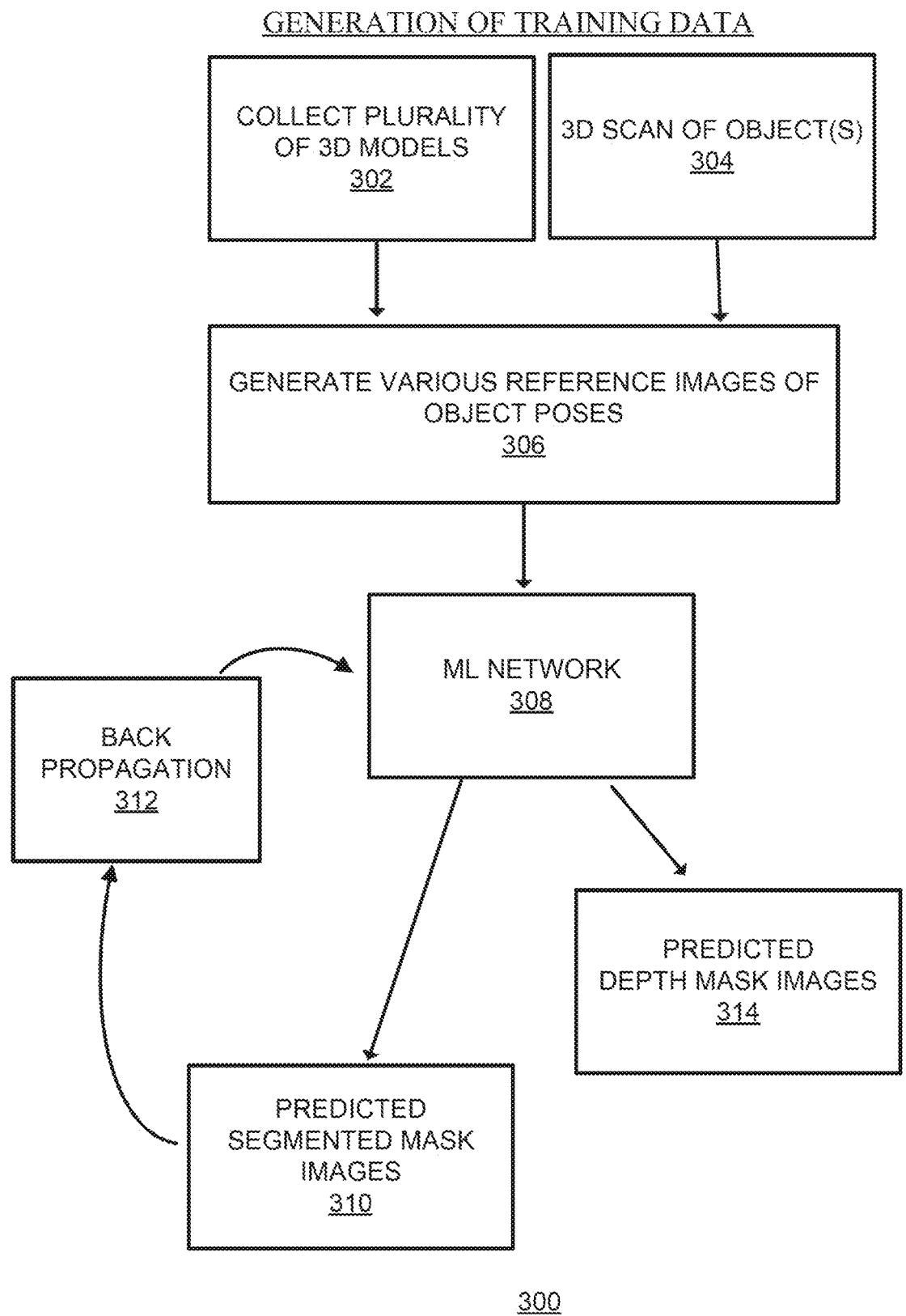
FIG. 3 is a diagram illustrating an exemplary environment in which some embodiments may operate.

As shown in the diagram 300 of FIG. 3, various embodiments described herein include the collection and generation of various portions of training data. The Engine collects a plurality of 3D models for various types of objects. (Act 302) For example, the Engine receives respective 3D models for various types of shoes. It is understood that the respective 3D models include a 3D model for multiple differing types (i.e. models) of shoes offered by a plurality of shoe manufacturing companies. A model may be, for example, a type of shoe that is referenced by a unique SKU identifier. In addition, the Engine receives scans of physical objects. (Act 304) For example, a scan of a physical instance of a particular type of shoe. In various embodiments, the Engine receives a plurality of scans whereby each scan may represent a different type of shoe. Each scan may further be translated into a corresponding 3D shoe model.

The Engine receives the input data (i.e. the 3D models, the plurality of scans) and processes the input data in order to generate various images of object poses. (Act 306) For example, given one or more 3D models and/or scans of a particular model of a shoe, the Engine synthetically generates one or more additional reference images of the same shoe model oriented according to different poses. It is understood that a pose of an object portrays that object according to a perspective view defined according to a particular orientation of the object in 3D space on an x, y and z axis. For example, the Engine synthetically generates multiple reference images of a particular type of athletic shoe whereby each respective reference image portrays a representation of the same type of athletic shoe viewed and oriented according to a different pose. As such, the Engine may synthetically generate a plurality of reference images for a particular type of shoe, and further generate a plurality of reference images for another particular type of shoe. The Engine may implement this process over any number of shoes. It is understood that the various embodiments described herein are not limited to objects being only different types of shoes. Instead, an object can be any type of physical item.

In various embodiments, the Engine synthetically generates the various reference images from the perspective of an emulated camera that acts as a reference point in 3D space with regard to each pose. The Engine may generate a first reference image of a first type of shoe. The Engine may modify and/or manipulate the pose of the first reference image of the first type of shoe to generate additional reference images of the first type of shoe situated according to different poses.

The Engine feeds one or more reference images into a machine learning network(s) 308 as training data. (Act 308) For each reference image used as training data, the reference image further includes depth values for each pixel of the corresponding reference image. The pixel depth value represents a distance from a particular pixel in a reference image to a position of an emulated camera from which the perspective view of the object's pose in the reference image is based. For example, a pixel depth value represents a distance between a particular pixel in the reference image and the emulated camera's placement in 3D space with regard to an orientation (i.e. pose) of an object portrayed in that reference image and defined according to an x, y and z axis. During the training phase, the machine learning network 308 outputs various predicted segmented mask images 310 and various predicted depth mask images 314 as described in various embodiments herein. The training phase further includes implementation of a back propagation algorithm 312 that includes the feedback of a loss function.

For a predicted segmented mask image output during the training phase resulting from an input training reference image, the feedback loss function provides an indication of a measure of a classification error between portions in the predicted segmented mask image that portray the object and portions in the predicted mask image that portray the background surrounding the object. The measure of the classification error may be determined by comparing the predicted segmented mask image with classification ground truth provided by the input training reference image. For a predicted depth map image generated during the training phase resulting from an input training reference image, the feedback loss function compares the predicted depth with ground truth depth of the input training reference image.

Figure 4:
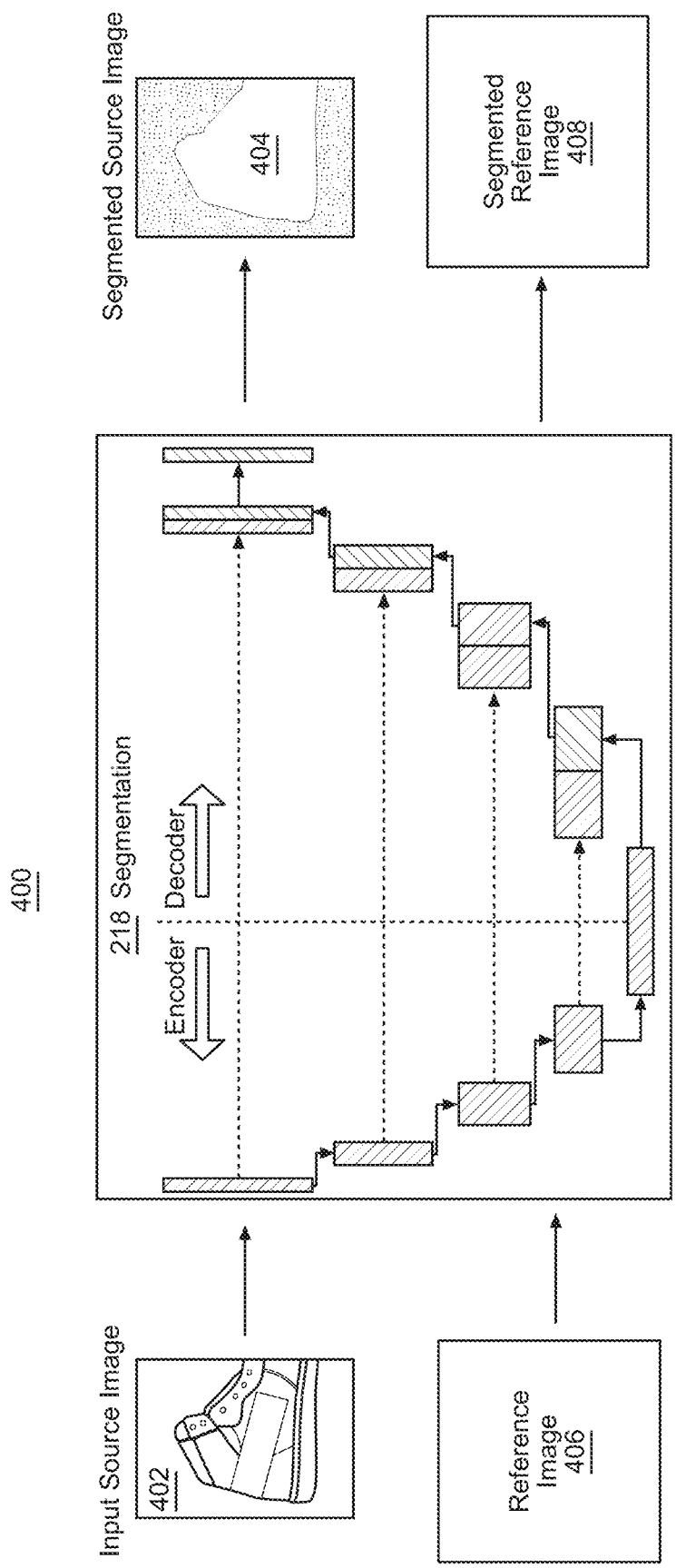
FIG. 4 is a diagram illustrating an exemplary environment in which some embodiments may operate.

As shown in diagram 400 of FIG. 4, the segmentation phase 218 implemented by the Engine receives an input source image 402 and feeds the input source image 402 into an encoder/decoder network. The segmentation phase 218 outputs a segmented mask image 404 based on the source image 402. For example, the segmented mask image 404 is based on content of the input source image 402, whereby the encoder/decoder network removes one or more sections of background content in the input source image 402 that does not include content that corresponds to the object of interest, such as a shoe.

In addition, the Engine identifies a corresponding reference image 406 upon receipt of the input source image 402. For example, the corresponding reference image thereby includes content that portrays the same type of object in a predefined pose whereas a variation of that pose is portrayed in the input source image 402. The segmentation phase 218 further generates a segmented mask image 408 based on the reference image 406.

Figure 5:
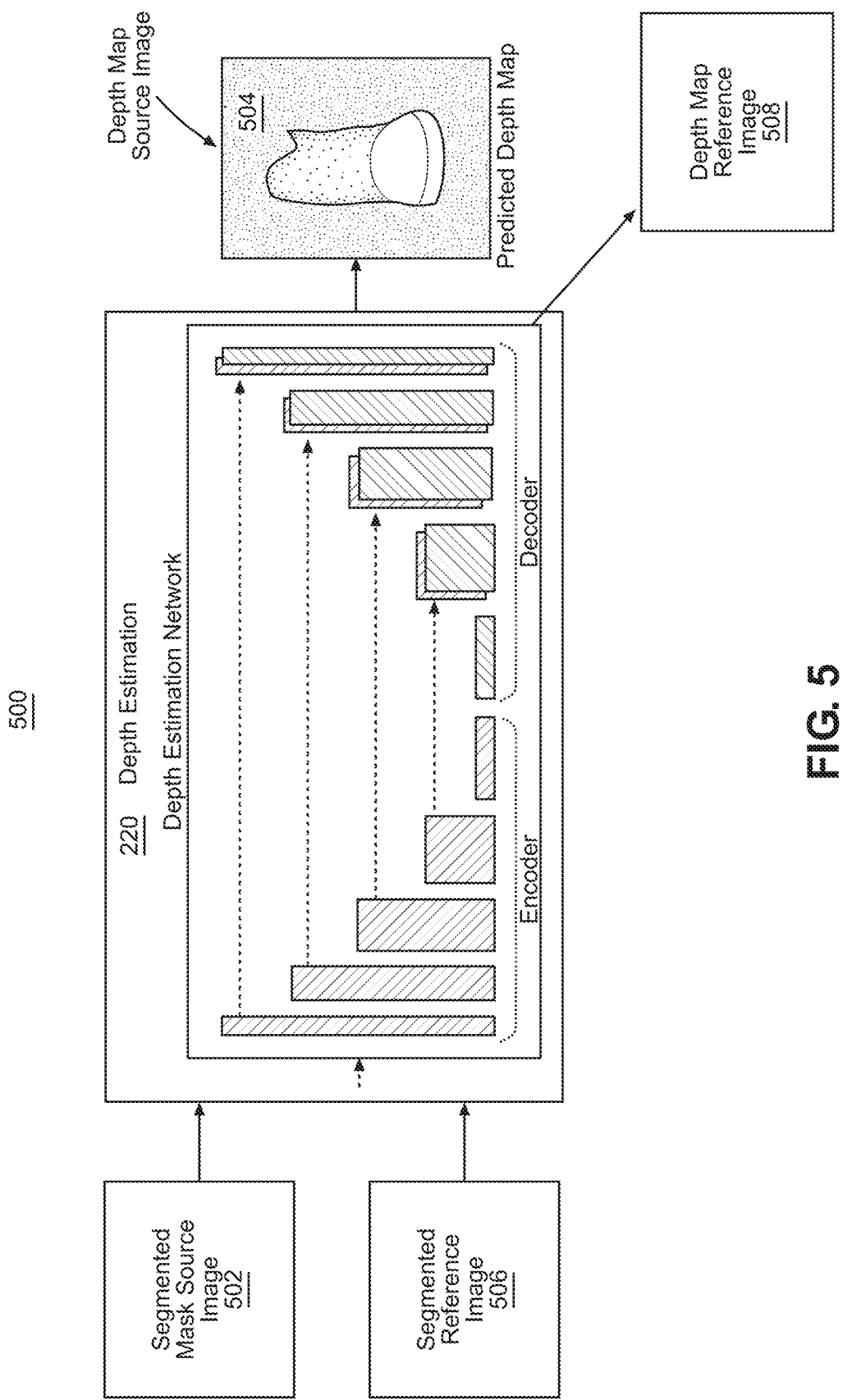
FIG. 5 is a diagram illustrating an exemplary environment in which some embodiments may operate.

As shown in diagram 500 of FIG. 5, the depth estimation phase 220 implemented by the Engine receives a segmented mask source image 502 output from the segmentation phase 218 and inputs the segmented mask source image 502 into a depth estimation network. The depth estimation phase 2020 outputs a depth map source image 504 based on the input segmented mask source image 502. According to various embodiments, the depth estimation network determines a distance of an emulated camera from each pixel in the input segmented mask image 502 to generate a depth map source image 504 that represents a predicted shape of the object portrayed in the input segmented mask source image 502. The Engine further inputs the corresponding segmented mask source image 506 into the depth estimation network. The depth estimation network outputs a depth map for the reference image 508 as well, whereby the depth map for the reference image 508 represents a predicted shape of the object portrayed in the reference image.

Figure 6:
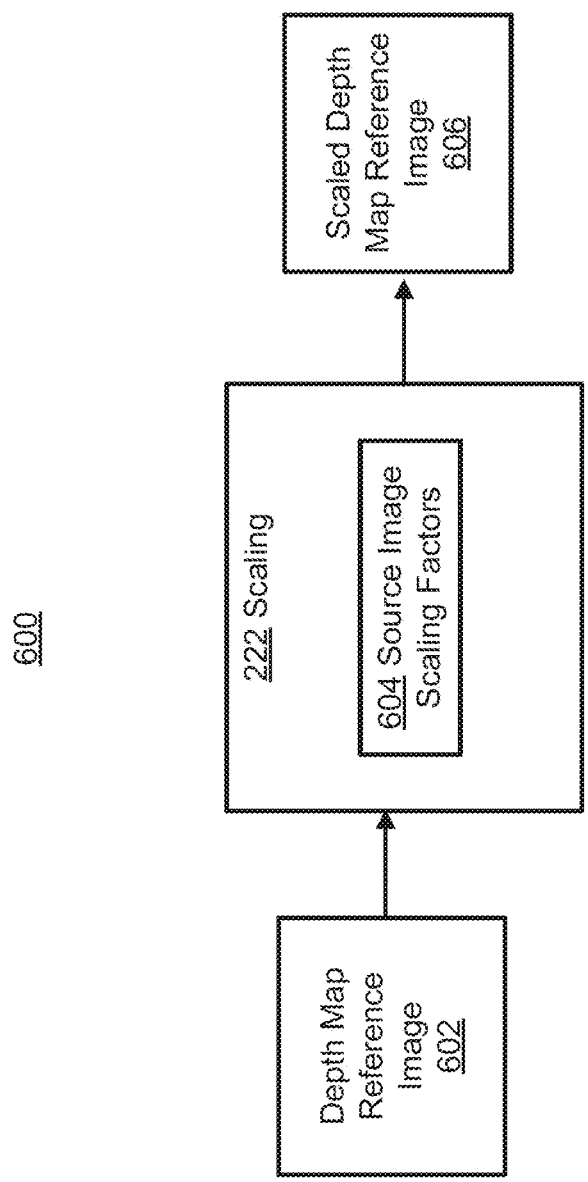
FIG. 6 is a diagram illustrating an exemplary environment in which some embodiments may operate.

As shown in flowchart 600 of FIG. 6, during the scaling phase 222, the Engine identifies one or more scaling factors 604 associated the source image 402. For example, one or more of the scaling factors 604 may b: a focal length associated with a camera that captured the source image, a type of light sensor associated with the camera that captured the source image and a pre-defined size measurement related to an instance of the object portrayed in the source image. The scaling phase 222 applies the scaling factors 604 to the depth map reference image 602 in order to modify and scale the image 602 in order to generate a scaled depth map reference image 606. By generating the scaled depth map reference image, the Engine prepares a reference image scaled to include one or more characteristics of an image that was captured by the same camera that captured the source image that is currently undergoing processing for pose correction.

Figure 7A:
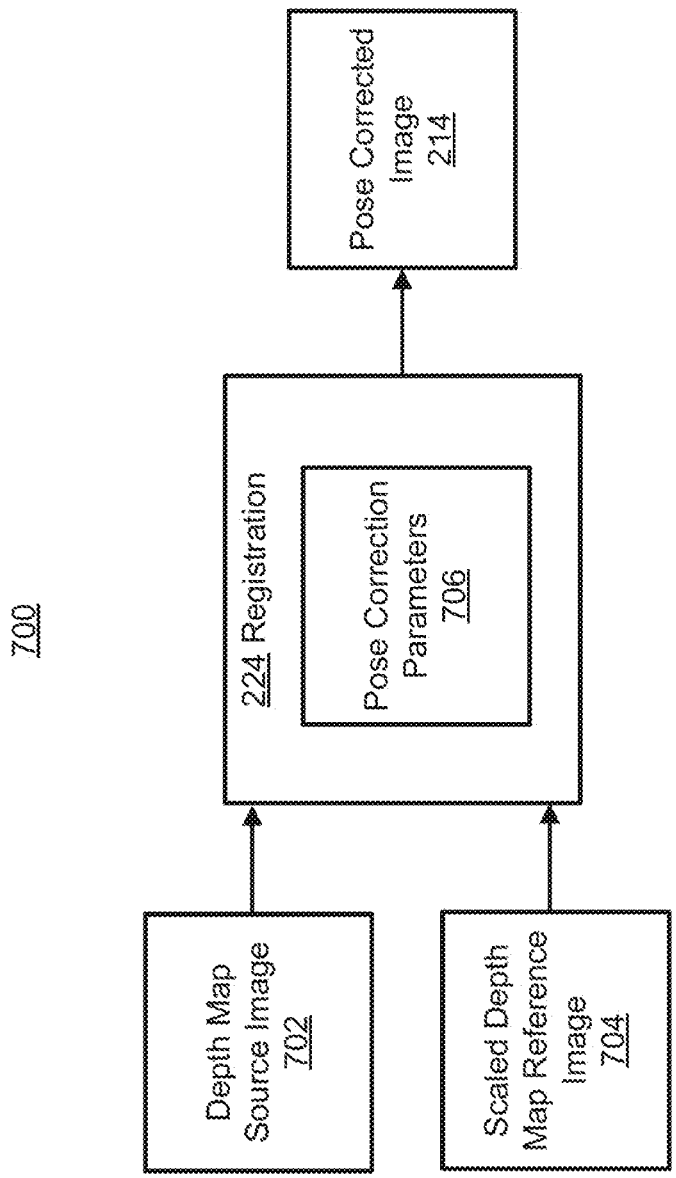
FIGS. 7A, 7B and 7C are each a diagram illustrating an exemplary environment in which some embodiments may operate.

As shown in flowchart 700 of FIG. 7A, during a registration phase 224, a depth map source image 702 and a scaled depth map reference image 704 are received as input. The Engine determines differences between the images 702, 704 by aligning respective portions of the images 702, 704. The Engine identifies occurrences of misalignment between the respective image portions the Engine attempted to align. The Engine generates one or more pose correction parameters 706. For example, the pose correction parameters 706 may be one or more translation parameters and one or more rotation parameters.

The Engine applies the pose correction parameters 706 to the corresponding original source image to generate a pose corrected image 214. Application of the pose correction parameters 706 emulates graphically rotating various portions of the portrayal of the object in the source images to generate additional object portions incorporated with the content from the source image, whereby the incorporated additional object portions create a visual appearance of the object in the source image as precisely positioned in a particular predefined pose. As such, the incorporated additional object portions represent segments or areas of the objects that were not portrayed in the source image (i.e. obscured) but should have been if the object portrayed in the source image had been precisely positioned according to the particular predefined pose.

Figure 7B:
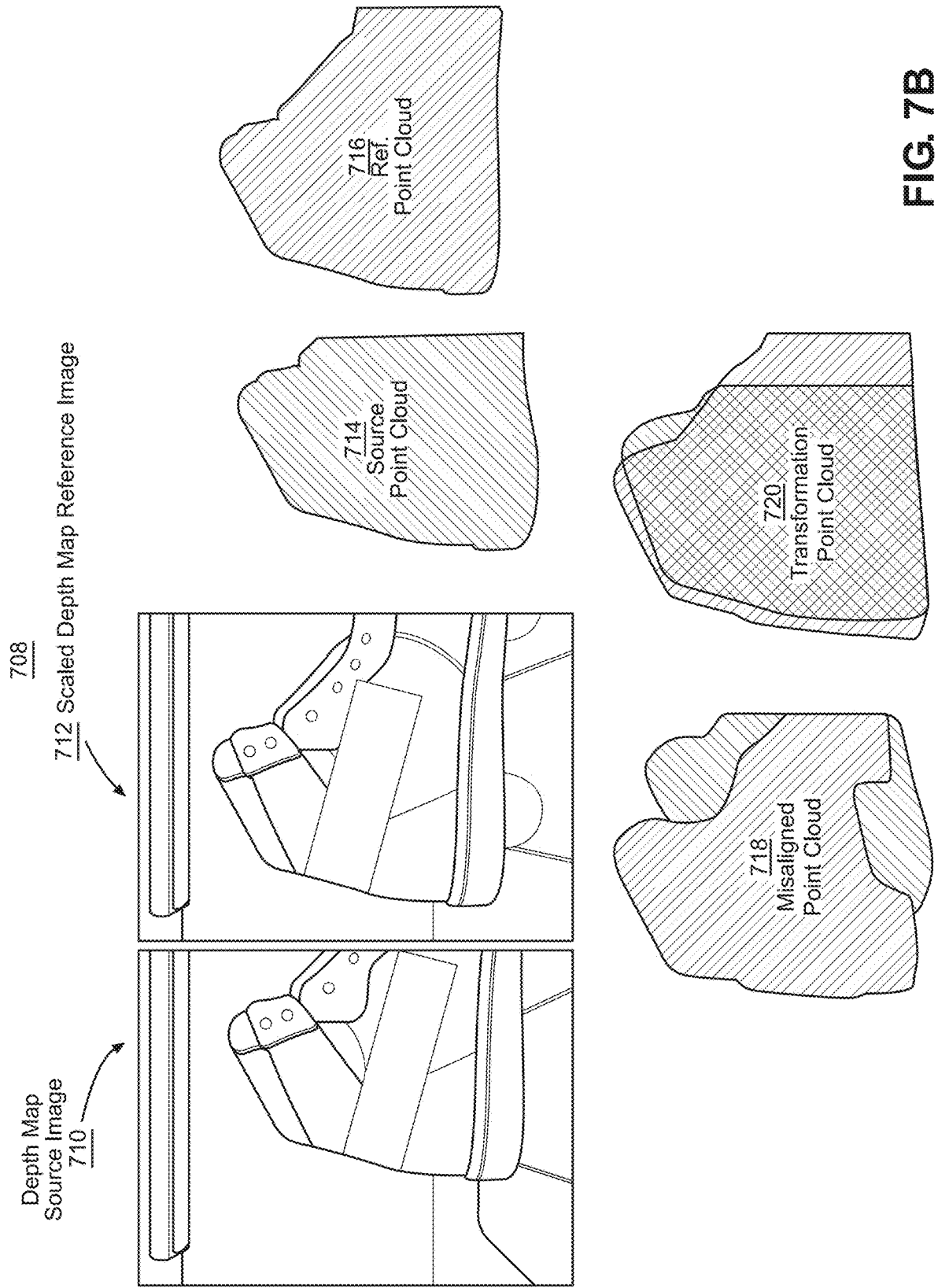

As shown in flowchart 708 of FIG. 7B, during the registration phase 224, the Engine predicts a source 3D map of the shape of the object based on a depth map source image 710 and predicts a reference 3D map of the object based on the scaled-depth map reference image 712. The Engine projects each of the source 3D map and the reference 3D map into a 3D space; and aligns the projected source and reference 3D maps to identify one or more differences. In various embodiments, the Engine implements an iterative closest point algorithm to align the projected source and reference 3D maps. In other embodiments, the Engine may implement a sift algorithm for alignment. A misalignment may be, for example, one or more respective differences between a section(s) of the source 3D map with a corresponding section of the reference 3D map(s). Various embodiments, the Engine further identifies misalignment due to a conflict of colors present in various sections of the source 3D map and the reference 3D map that do not overlap.

According to one or more embodiments, the Engine generates source point cloud data 714 based on the depth map source image 710 and generates reference point cloud data 716 based on the scaled-depth map reference image 712. It is understood that, the point cloud data 714, 716 may be based on a segmentation(s) representative of an object portrayed in the depth map images 710, 712. The Engine attempts to align the point cloud data 714, 716 to identify differences between the point cloud data 714, 716. For example, the Engine identifies misalignment 718 between the point cloud data 714, 716. In one or more embodiments, identified misalignment 718 may be respective portions of the point cloud data 714 that do not overlap with respective portions of the point cloud data 716. Such identified misalignments 718 (i.e. respective portions without overlap) our identified by the Engine as differences for which the pose correction parameters 706 are generated to correct.

Figure 7C:
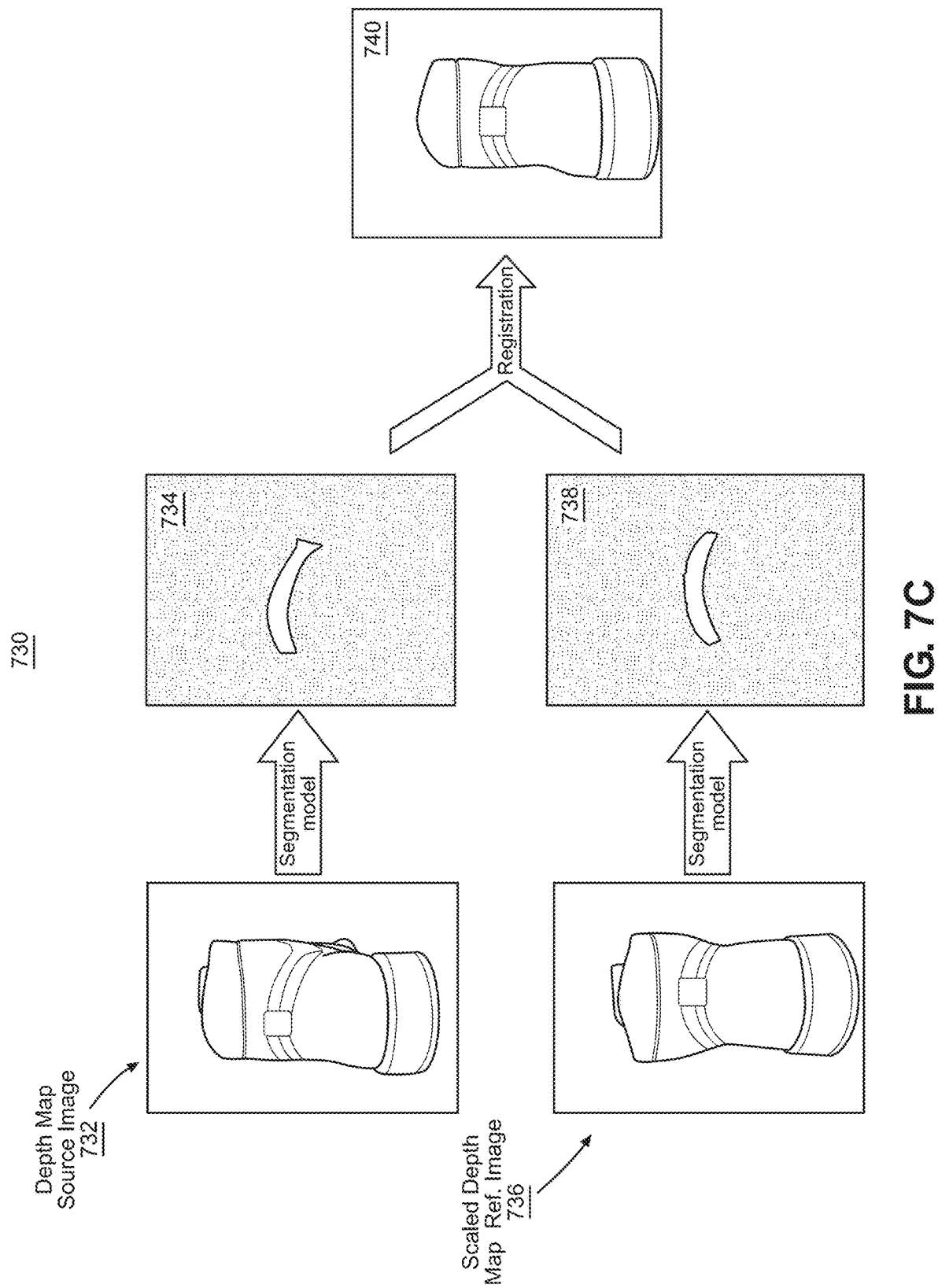

As shown in flowchart 730 of FIG. 7C, during the registration phase 224, the Engine may receive a depth map source image 732 and a scaled depth map reference image 736 and may further segment out a particular predefined portion of the object portrayed in the images 732, 736. For example, if the object is a shoe, a heel tab shoe portion may be predefined as a registration portion to be analyzed during the registration phase 224. The Engine generates a segmentation mask 734, 738 of the heel tab from both images 732, 736. Upon generating the segmentation masks 734, 738, the Engine attempts to align heel tab segmentation masks 734, 738 in order to identify differences between the heel tab segmentation masks 734, 738.

The Engine generates pose correction parameters 706 for adjusting a pose of the heel tab in the source segmentation mask 734 for alignment with the pose of the heel tab portrayed in the reference segmentation mask 738. The Engine further applies the pose correction parameters 706 generated for the heel tab in the source segmentation mask 734 to other various sections of the corresponding source image in order to generate the pose corrected image 214.

According to various embodiments, the registration phase 224 aligns two or more images taken at different positions. The registration phase 224 aims to geometrically align the source image (portraying an object according to a variation of a predefined pose) with a reference image (portraying the same type of object precisely according to the predefined pose). The Engine calculates depth for both the source and reference images using a monocular depth estimation network.

The predicted depth is obtained for the source image as well as the reference image, alternatively, depth for the pose of the reference image may be obtained by a depth sensing sensor and or a computer-generated 3D model may be used. According to one or more embodiments depth is based on a distance value for each pixel in an image, where the distance value represents a measurement of distance from the respective pixel and a predefined position and orientation of a simulated camera represented as being external to the image.

The Engine reprojects the predicted depths to obtain 3D point clouds for each of the source image and the reference image. The Engine executes one or more registration algorithms to compute a transformation matrix to align the 3D point clouds. The Engine may perform a two-step registration, which includes global registration followed by a local registration. Global registration methods include algorithms which do not require a measure of a proper (or adequate) initialization. Such global registration methods produce alignment results with a higher degree of error and are used as initialization for local methods. Local registration methods use the initial alignment and produce alignment methods with less degree of error According to various embodiments, the Engine implements global registration according to one or more of the following algorithms: Scale Invariant Feature Transform, Fast Point Feature Histogram, Random Sample Consensus. For local registration subsequent to global registration, the Engine implements one or more of the following algorithms: iterative closest point (ICP), colored iterative closest point.

In various embodiments, the Engine implements the ICP algorithm during local registration by, for each point in the source point cloud, matching a closest point in the reference point cloud. The Engine then estimates a combination of rotation and translation parameters that minimizes a mean square point-to-point distance metric that optimizes (i.e. best aligns) each source point to the corresponding matching reference point identified in the previous stage of closest point matching. The Engine transforms the source points according to a transformation based on the rotation and translation parameters.

In various embodiments, the Engine implements the Color ICP algorithm during local registration. The Engine implements the Color ICP algorithm by performing segmentation of the reference image to extract one or more segment and modifies the RGB (red-blue-green) values of each pixel in the segment(s) based on an average RGB value of pixels in the source image. Alternatively, the Engine utilizes a deep colorization network.

Figure 8:
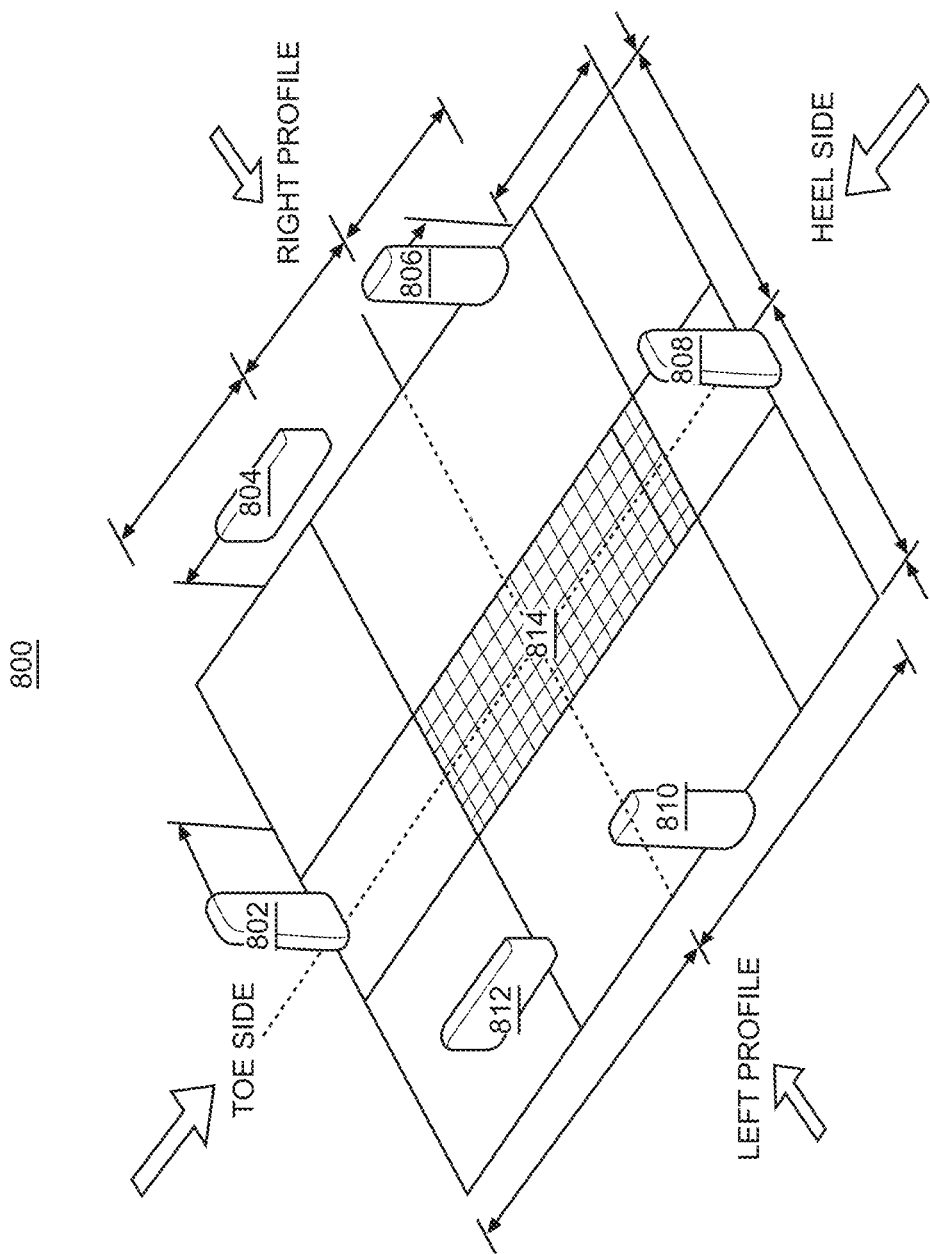
FIG. 8 is a diagram illustrating an exemplary environment in which some embodiments may operate.

FIG. 8 illustrates a diagram 800 of a lightbox. According to various embodiments, a lightbox may be a physical structure in which any type of physical object may be placed according to various predefined physical positions and orientations. For example, a shoe may be situated in a fixed position on a platform 814 within the lightbox. The lightbox may have multiple image capture devices (e.g. cameras, smartphones, etc.) 802, 804, 806, 808, 810, 812, 814 at fixed or adjustable positions to capture one or more source images of various portions and various portions of the shoe. In various embodiments, a source image of the shoe may be captured by a particular image capture device 802. Since the relative position of all other image capture devices 804, 806, 808, 810, 812 is known, the Engine can implement pose correction of source images related to various predefined poses that are different than a particular predefined pose that corresponds with a single source image, such as a single source image captured by a particular image captured 802. Stated differently, a first source image may portray the shoe according to a first predefined pose and a plurality of other source images may portray the same shoe according to various different predefined poses. During the registration phase, the Engine generates respective translation and rotation parameters for a transformation to generate a pose corrected image for the first source image. When preprocessing the other source images portraying the same shoe according to the various different predefined poses, the Engine need not generate additional translation and rotation parameters or transforming each of the other source images. Rather, the Engine utilizes the translation and rotation parameters generated for the first source image to further generate respective translation and rotation parameters for each of the other source images based on each source image fixed position.

For example, the image capture device 802 for the first source image may be defined as a reference device having reference coordinates based on the device's 802 known position at the lightbox with respect to the shoe on the platform 814 and the other devices 804, 806, 808, 810, 812. As such, a particular different device 804 may be defined as a having relative coordinates with respect to the reference coordinates of the reference device 802. The Engine generates a reference transformation to generate a pose corrected image for the first source image from the reference device 802. For generating a transformation for use in generating a pose corrected image for an image captured at the different device 804, the Engine maps the reference transformation used for the first source image to a relative transformation that corresponds with images from the different device 804.

The Engine calculates a change of orientation from a center location on the reference device 802 to a center location on the different device 804. The Engine adjusts the reference transformation for pose correction to account for change of orientation of a center device location from the reference device 802 to the center device location of the different device 804. The resulting adjusted reference transformation thereby represents pose correction parameters for images captured by the difference device 804 generated without having to execute a global and local registration process on an image captured by the different device.

It is understood that various embodiments of the Engine described herein may use any suitable machine learning training techniques to train the machine learning network 130 for each sensor, including, but not limited to a neural net based algorithm, such as Artificial Neural Network, Deep Learning; a robust linear regression algorithm, such as Random Sample Consensus, Huber Regression, or Theil-Sen Estimator; a kernel based approach like a Support Vector Machine and Kernel Ridge Regression; a tree-based algorithm, such as Classification and Regression Tree, Random Forest, Extra Tree, Gradient Boost Machine, or Alternating Model Tree; Naïve Bayes Classifier; and other suitable machine learning algorithms.

Figure 9:
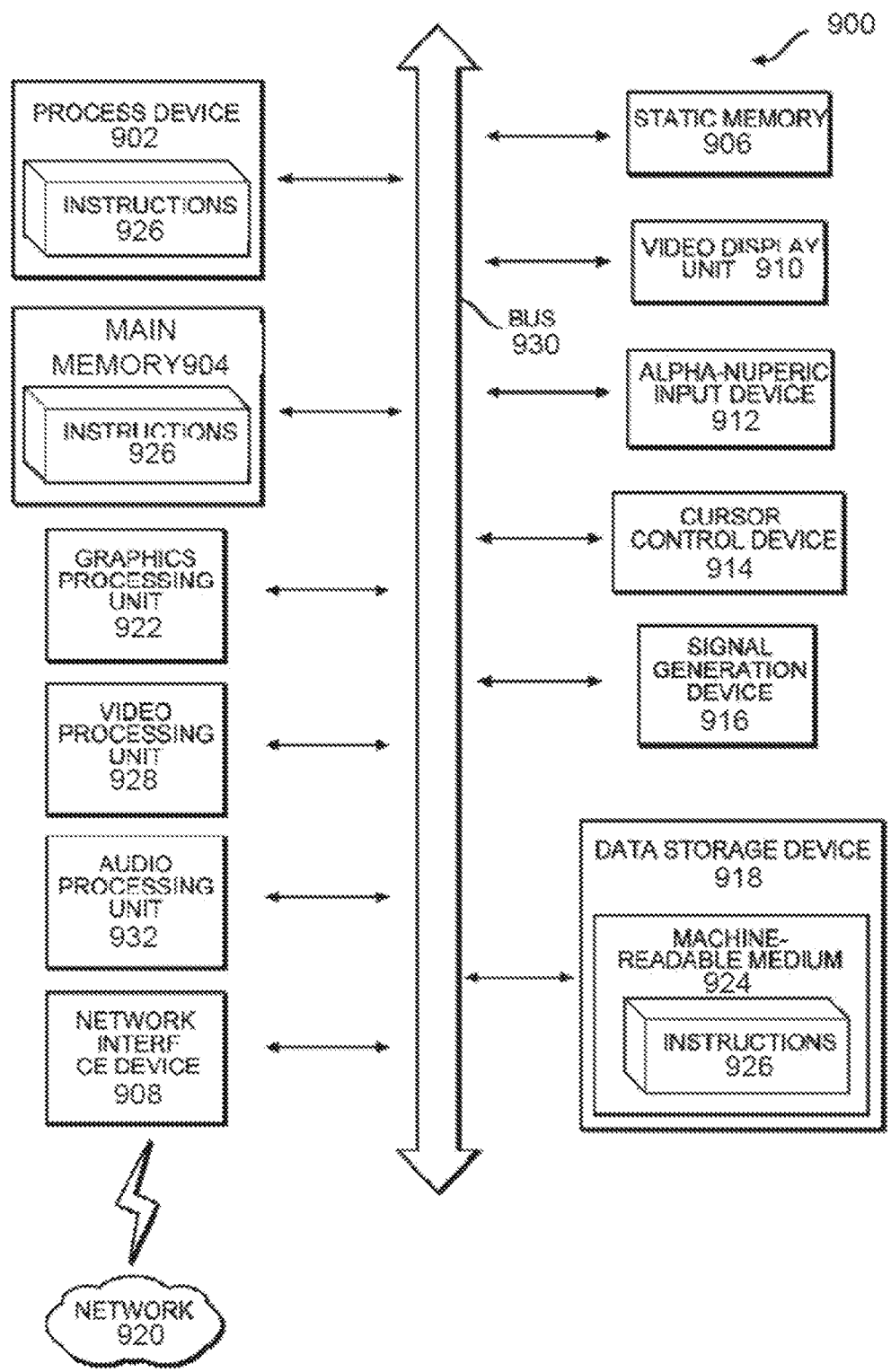
FIG. 9 is a diagram illustrating an exemplary environment in which some embodiments may operate.

FIG. 9 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a computer-readable medium) on which is stored one or more sets of instructions or software 926 embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In one implementation, the instructions 926 include instructions to implement functionality corresponding to the components of a device to perform the disclosure herein. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
   receiving a plurality of source images of an object placed at a physical structure associated with a plurality of image capture devices, a first source image associated with a first image capture device positioned relative to placement of the object at the physical structure;
   identifying a reference image portraying the object according to a second pose, a first pose of the object portrayed in the first source image comprising a variation of the second pose of the reference image;
   generating a three-dimensional (3D) map of a shape of the object based on the first source image;
   generating a 3D reference map of the object based on the reference image;
   aligning respective portions of the 3D map of the shape of the object with respective portions of the 3D reference map;
   identifying at least one obscured portion of the shape of the object that corresponds to a respective misalignment between the 3D map of the shape of the object and the 3D reference map;
   generating one or more pose correction parameters, based on the positioning of the first image capture device at the physical structure, for each received additional source image associated with a respective image capture device at the physical structure; and
   generating a pose corrected image of the object, via utilization of the one or more pose correction parameters, that includes at least a portion of the first source image and at least one identified obscured portion of the shape of the object.

2. The computer-implemented method as in claim 1, wherein identifying a reference image comprises:
   prior to identifying at least one obscured portion:
   generating a plurality of reference images of the object, wherein each respective reference image portrays the object according to a different predefined pose;
   selecting, from the plurality of reference image, a reference image portraying a predefined pose of the object related to the first pose of the first source image.

3. The computer-implemented method as in claim 1, wherein generating the 3D map of a shape of the object based on the source image comprises:
   generating a segmented mask image of the first source image ("segmented source image"); and
   generating a depth map image based on the segmented source image ("depth map source image").

4. The computer-implemented method as in claim 3, wherein generating a 3D reference map of the object based on the reference image comprises:
   identifying one or more scaling factors associated with the first source image;
   generating a segmented mask image of the reference image ("segmented reference image");
   generating a depth map image based on the segmented reference image ("depth map reference image"); and
   generating a scaled-depth map reference image by modifying the depth map reference image according to the one or more identified scaling factors.

5. The computer-implemented method as in claim 4, wherein aligning respective portions of the 3D map of the shape of the object comprises:
   predicting a source 3D map of the shape of the object based on the depth map source image;
   predicting a reference 3D map of the object based on the scaled-depth map reference image;
   projecting each of the source 3D map and the reference 3D map into a 3D space; and
   aligning the projected source and reference 3D maps to identify one or more differences, wherein the one or more respective difference comprises a misalignment between a respective section of the source 3D map with a corresponding section of the reference 3D map.

6. The computer-implemented method as in claim 5, wherein generating one or more pose correction parameters, comprises:
   determining at least one of a rotation parameter and a translation parameter based on the first source image;
   determining additional rotation parameters and translation parameters for at least one particular additional source image based on the rotation parameter and the translation parameter for the first source image; and
   applying the respective parameters to the section of the source 3D map to generate a portion of the pose-corrected image.

7. The computer-implemented method as in claim 6, wherein determining additional rotation parameters and translation parameters for at least one additional source image comprises:
   determining the additional rotation parameters and the translation parameters based on the position of the first image capture device relative to the object and further relative to a position in the physical structure of a particular image capture device that generated the particular additional source image.

* * * * *